United States Patent [19]

Evans

[11] 4,378,098

[45] Mar. 29, 1983

[54] APPARATUS AND METHOD FOR LOWERING AND RAISING AN AIRPLANE FOR LOADING AND UNLOADING

[75] Inventor: Alfred N. Evans, Castel Volturno, Italy

[73] Assignee: The Boeing Company, Seattle, Wash.

[21] Appl. No.: 251,597

[22] Filed: Apr. 6, 1981

[51] Int. Cl.³ .............................................. B64C 1/22
[52] U.S. Cl. ............................. 244/137 R; 244/118.1; 244/102 R; 254/423
[58] Field of Search ............ 244/102 R, 118.1, 137 R; 254/86 R, 86 H, 47, 93 VA; 414/401

[56] References Cited

U.S. PATENT DOCUMENTS

| | | | |
|---|---|---|---|
| 2,513,855 | 7/1950 | Fogwell | 254/86 R |
| 3,155,373 | 11/1964 | Rae | 254/86 R |
| 3,198,486 | 8/1965 | Allen | 254/86 H |
| 3,332,661 | 7/1967 | Hand | 254/86 H |
| 3,869,102 | 3/1975 | Carroll | 244/118.1 |
| 3,954,232 | 5/1976 | Harper | 244/102R |

FOREIGN PATENT DOCUMENTS 913783 12/1962 United Kingdom ............ 244/137 R

Primary Examiner—Charles E. Frankfort
Attorney, Agent, or Firm—Nicolaas DeVogel; Bernard A. Donahue

[57] ABSTRACT

Aircraft lowering and raising apparatus for loading and unloading purposes wherein the apparatus comprises four supporting structures, two located at a spaced distance at the left and two similarly at the right side of the fuselage. Each structure is horizontally carried within the aircraft and can be extended in a vertical position outside of the aircraft. Each structure includes a hydraulic telescoping piston cylinder arrangement with a ground feeler for extending a tripod carriage which is pivotally connected to the cylinder. Upon operation, the structure moves from its aircraft storage unit outside in vertical position and engages the ground by extension of its telescoping member to support the aircraft, thereupon the landing gears are contracted into the aircraft body, and thereafter the telescoping piston cylinder is contracted so that the aircraft is lowered for cargo handling. Raising of the airplane on its landing gears for takeoff is obtained by reversing the described operations of the supporting structures.

4 Claims, 22 Drawing Figures

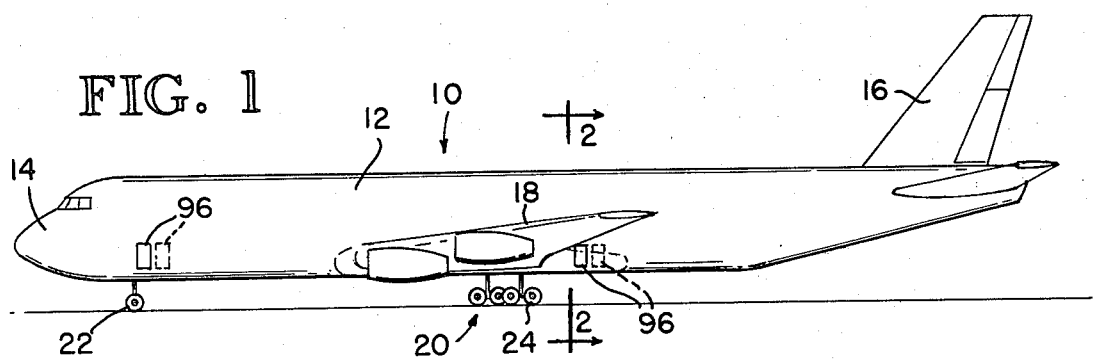
FIG. 1
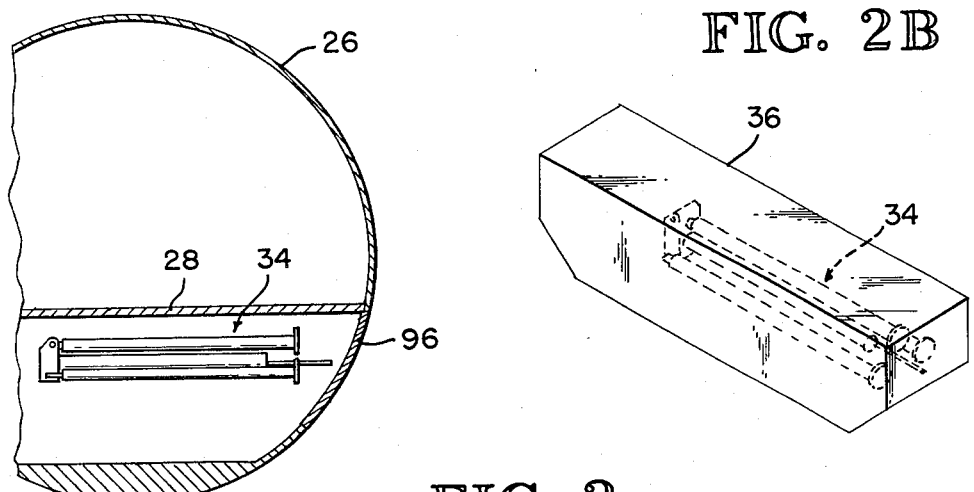
FIG. 2
FIG. 2B
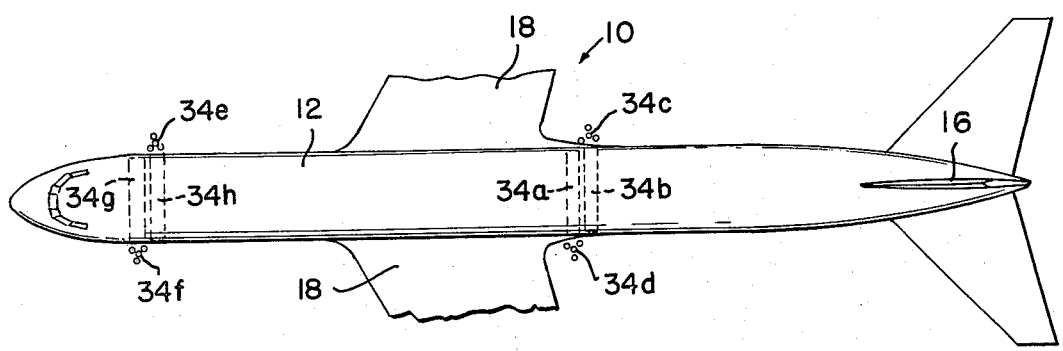
FIG. 2A

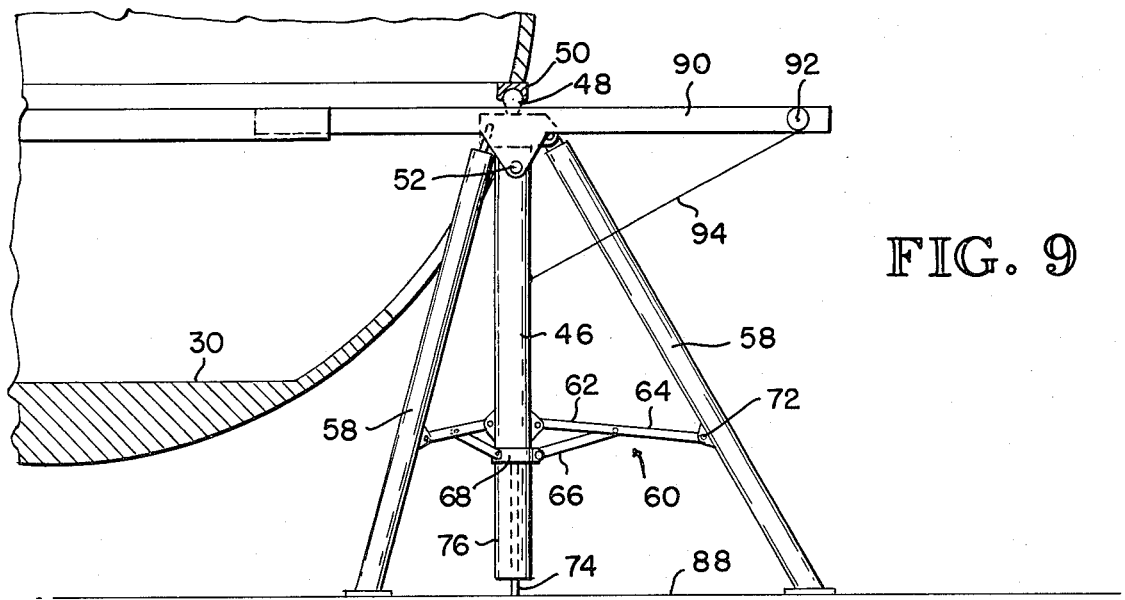
FIG. 9
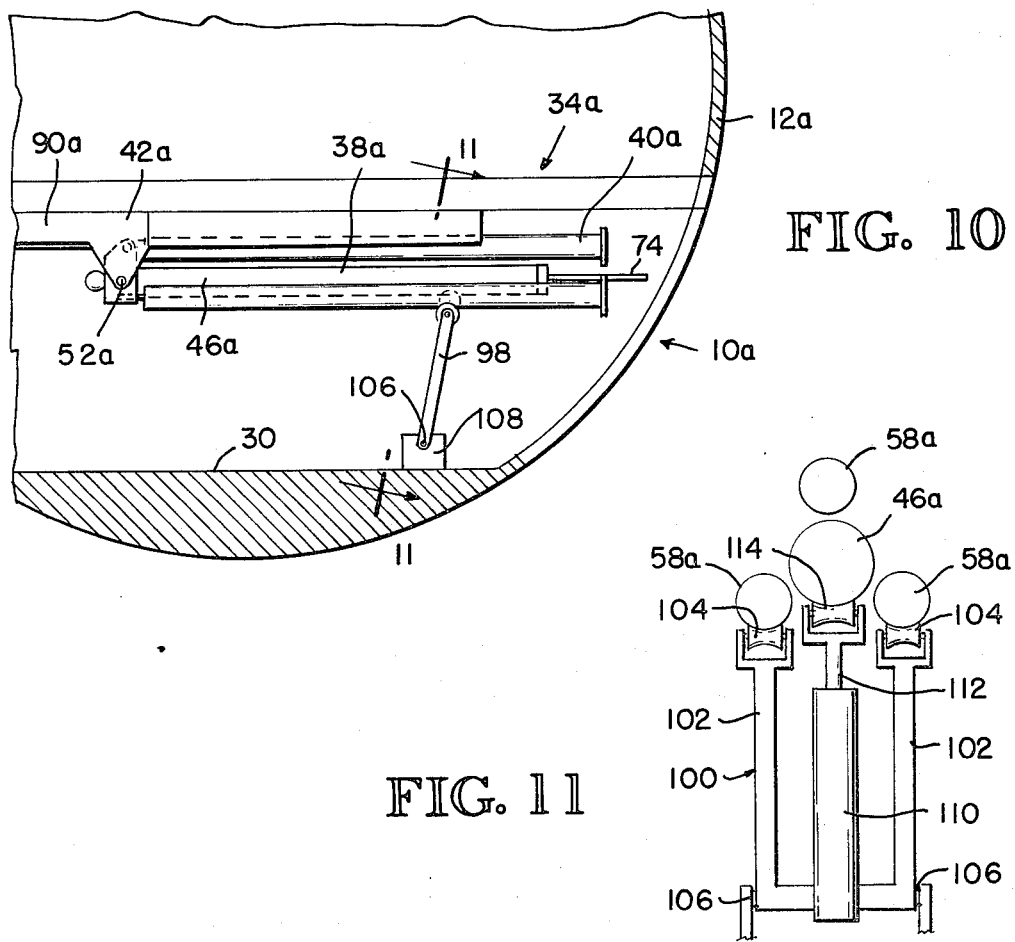
FIG. 10
FIG. 11

APPARATUS AND METHOD FOR LOWERING AND RAISING AN AIRPLANE FOR LOADING AND UNLOADING

DESCRIPTION

1. Technical Field

The present invention relates to a method and apparatus for bringing an aircraft to a low position relative to a ground surface for loading and unloading, and more particularly to such a method and apparatus that is especially adapted for use with an aircraft having a conventional landing gear.

2. Background Art

When a large cargo aircraft is being loaded or unloaded, it is desirable to locate the aircraft as close to the ground as possible. Thus, in at least one such cargo aircraft, the landing gear itself is made so that when the airplane is supported from the ground surface by the landing gear, the landing gear can be caused to "kneel" (i.e. moved closer to the airplane) so as to still provide support to the airplane while bringing it closer to the ground surface. While such devices are operational, it does require the landing gear to be specially constructed for this additional kneeling operation. With regard to existing aircraft which do not have landing gear with this kneeling capability, it has been proposed to retrofit the landing gear of such aircraft to facilitate use as a cargo carrier with more convenient loading and unloading capabilities. Also, in some instances, cargo airplanes are provided with stabilizing struts that are lowered to a ground engaging position after the landing gear has moved to its kneeling position.

A search of the patent literature has disclosed a number of patents related to lifting devices for various vehicles. While not all of these are considered particularly relevant to the present invention, these are disclosed herein to insure that there is a disclosure of all possibly relevant prior art.

U.S. Pat. No. 1,266,409, Cohen, shows a set of extendable screw jacks mounted to the lower side of an automobile. It is stated that the purpose of these jacks is that when the vehicle is stored overnight or stored for a period of time, the vehicle can be lifted to alleviate the load from the tires. Also, in an emergency situation where there is a puncture or blow out, the jacks can be used to lift the automobile and permit the replacing of new tires.

U.S. Pat. No. 1,956,688, Kuns, shows a motor vehicle trailer that has the front set of wheels vertically adjustable. Thus, when the trailer is on a slanted ground surface, and it is desired to level the trailer so that it could conveniently be used for living purposes, the front set of wheels can be lowered or retracted for this purpose.

U.S. Pat. No. 2,413,242, Murray, shows a pair of lifting jacks which are used to raise a fuselage of an airplane from the ground surface so that it could be mounted to a trailer or truck.

U.S. Pat. No. 2,533,925, Fulton, Jr., discloses a convertible airplane/automotive vehicle. The airplane portion of the device has vertically movable ground engaging members that can be moved downwardly for ground support so that the "automobile" portion of the vehicle can be moved away from the aircraft.

U.S. Pat. No. 2,593,785, Nye et al, shows a device somewhat similar to the Fulton Jr. device noted immediately above. When the vehicle is on a ground location, the adjustable supports on the airplane portion can be operated to move the airplane portion upwardly a sufficient distance to permit the automobile unit to be driven out from under the airplane portion. Also, the lifting of the airplane portion permits the automobile unit to be backed under it in position to be reattached. The airplane portion is provided with ground wheels to permit it to be pushed off the runway and into a convenient parking area after the automobile has departed.

U.S. Pat. No. 2,672,315, Barenyi, discloses a set of lifting jacks mounted to an automobile. These jacks are positioned at a particular angle to alleviate certain stresses on the jacks when the automobile is raised to a position where it is tilted.

U.S. Pat. No. 3,150,849, Conway et al, shows an aircraft having a nose section which carries a front landing gear and which is pivotally mounted for sideways movement away from the front end of the aircraft so that the aircraft can be loaded and unloaded. Immediately behind the hinged nose portion, there is a rigid telescopic strut which can be extended to a ground-engaging position, and then locked. Then the nose section can be moved laterally in an arcuate path away from the main fuselage, with the locked strut providing ground support for the aircraft.

U.S. Pat. No. 3,198,486, Allen, discloses a set of jacks for a camper that can be mounted to a pickup truck. Each of the several jacks has at its lower end a tripod assembly to provide ground support.

U.S. Pat. No. 3,292,802, Hutchinson, shows a retractable support for a semitrailer. In the event that the semitrailer is not located at a conventional loading dock, the retractable support can be lowered to bring one end of the trailer closer to a ground location.

U.S. Pat. No. 3,350,063, Thurlow, Sr., et al, discloses a hydraulic jack assembly to be used with campers such as those which are carried on the pack of pickup trucks. These hydraulic jacks are operated from a common power source so that they can be raised simultaneously.

U.S. Pat. No. 3,532,307, Larson, discloses a retractable landing gear which operates without the use of hydraulic means. There is a motor to actuate a threaded member for extending and retracting the landing gear.

U.S. Pat. No. 3,870,276, Phillips, shows a stabilizing jack to be used beneath a recreational vehicle such as a trailer or self-contained motorized unit. The jack has a pair of pivotally mounted legs that extend in opposite directions. The legs are moved downwardly beneath the vehicle and the location of the legs is automatically adjusted to compensate for irregularities of the terrain. These jacks can also be used to raise the vehicle off its suspension.

DISCLOSURE OF THE INVENTION

The present invention is used in combination with an aircraft having landing gear which has a retracted position for flight operation and an extended position for take off and landing. The aircraft is characterized in that with the aircraft being supported from a ground surface by the landing gear in the extended position, the aircraft is at a first operating level.

The apparatus of the present invention enables the aircraft to be located at a low position relative to the ground surface, for example, for loading and unloading cargo. The apparatus comprises a ground engaging support means adapted to engage the ground surface. There is elevating means operatively connected between the aircraft and the ground engaging support means.

The elevating means is movable to a first raised position where the support means is moved downwardly relative to the aircraft to move the aircraft to a second raised level above the first operating level. The elevating means is also movable to a second lowered position where the support means is moved upwardly relative to the aircraft to move the aircraft to a third low level below the first operating level.

Thereby, with the aircraft supported from the ground surface by the landing gear in its extended position, the elevating means can be moved to its first position to raise the aircraft to the second level, so that the landing gear is free of the ground. The landing gear can then be moved to its retracted position, and the elevating means then moved to the second position to move the aircraft to its third low level for an operation such as loading or unloading.

In the preferred form, the apparatus has a stowed position within an outer surface contour of the aircraft. The apparatus is then movable to an operating position exterior of the surface contour where the elevating means can be moved from its first position to its second position. In one embodiment, the apparatus is moved laterally to the operating position, relative to a longitudinal axis of the fuselage.

In the preferred form, the elevating means has a lengthwise axis and is extendable and retractable along the lengthwise axis. In the stowed position, the lengthwise axis is generally horizontally aligned, and the elevating means is moved angularly to be generally vertically aligned so that the apparatus is in its operating position. In the preferred embodiment, there is an extendable carriage to which the elevating means and the support means are mounted, with the carriage being moved laterally from the stowed position to the operating position. In the specific form shown herein, the elevating means comprises a hydraulic jack, the carriage comprises a plurality of telescoping members, and the extension means comprises an extension member pivotally mounted to the carriage.

Desirably, the ground engaging support means comprises a plurality of leg members adapted to be moved outwardly from the elevating member to a down support position. Actuating means responsive to contact with the ground surface moves the leg members to the ground engaging position, this being accomplished specifically by an expanding linkage means.

In another embodiment, the aircraft has pod means mounted thereto, and the elevating means and the ground engaging means are positioned within the pod means. The elevating means is swung downwardly to its operating position.

In the method of the present invention, apparatus such as that described above is provided. The ground engaging support means is moved from a stowed position to an operating position and moved downwardly to engage the ground surface and then lift the aircraft so that the landing gear is free from the ground. The landing gear is then retracted, and the ground engaging support means moved upwardly to lower the aircraft. Subsequent to an operation such as loading or unloading, the ground engaging support means is moved downwardly to raise the aircraft, after which the landing gear can be extended. Then the ground engaging support means is raised and stowed in the aircraft, which can then proceed with normal operation.

Other features of the invention will become apparent from the following detailed description.

BRIEF DESCRIPTION OF THE DRAWINGS

FIG. 1 is a side elevational view of an aircraft incorporating the present invention;

FIG. 2 is a sectional view taken through the fuselage of the airplane of FIG. 1 at line 2—2, and showing one of the elevating units of the present invention in a stowed position;

FIG. 2A is a top view of the aircraft of FIG. 1, showing the location of the two pairs of oppositely disposed elevating units;

FIG. 2B is an isometric view of a modular structure containing one of the elevating units of FIG. 2;

FIG. 9 is a view similar to FIG. 8, showing the elevating unit retracted so as to lower the fuselage toward the ground surface;

FIG. 10 is a view similar to FIG. 2, showing a second embodiment of the present invention;

FIG. 11 is view taken along line 11—11 of FIG. 10, illustrating the support member for the elevating unit;

BEST MODES FOR CARRYING OUT THE INVENTION

Figure 3:
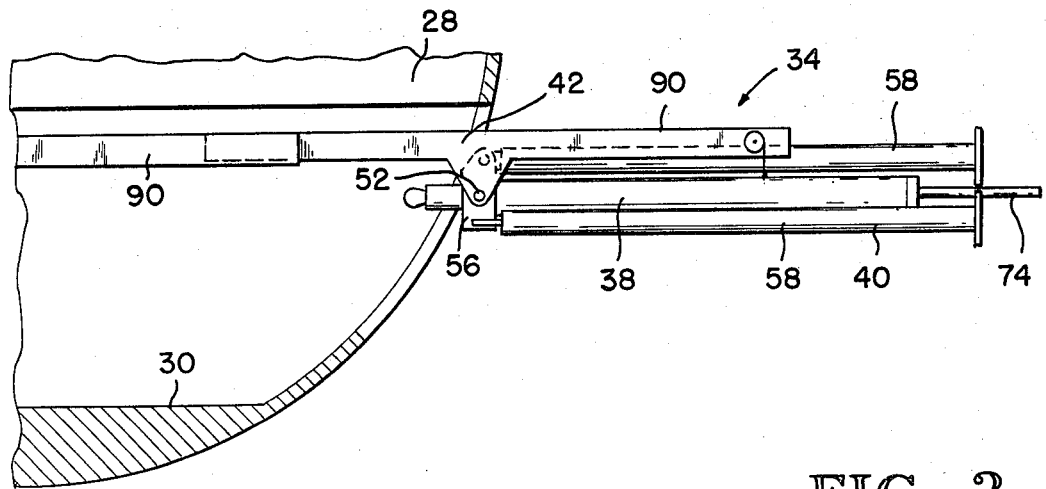
FIG. 3 is a sectional view taken at the same location of FIG. 2 showing the elevating unit moved outwardly from the stowed position of FIG. 2 toward a deployed position.

In FIG. 1, there is shown an aircraft 10 incorporating the present invention. This aircraft 10 comprises a fuselage 12, having a nose portion 14, a tail section 16, and also wings 18. The aircraft 10 is also provided with retractable landing gear 20 which are or may be of conventional design. As will be disclosed more fully hereinafter, one of the advantageous features of the present invention is that it can be conveniently incorporated in existing aircraft having conventional landing gear. As shown herein, the landing gear 20 comprises a nose gear 22 and a main gear 24 located at approximately the midlength of the fuselage 12.

As shown in FIG. 2, the fuselage has an outer skin or surface 26, a main deck 28 and a lower deck 30. The area between the main deck 28 and the lower deck 30 is generally referred to as the baggage compartment or lower cargo compartment.

In the particular configurations shown herein, the present invention is made up of four elevating units, each designated 34 which are positioned in the lower storage compartment 32. Two of these units are located a short distance rearwardly of the main landing gear 20 (these are designated 34c and 34d in FIG. 2A only) and two other units 34 are located a short distance rearwardly of the nose gear 22 (these are designated 34e and 34f in FIG. 2A only). To facilitate insertion of the elevating units 34 into the compartment 32, each unit 34 is provided as a modular unit and is mounted in a housing structure 36 (See FIG. 2B) having an overall configuration similar to baggage carriers that are inserted in the baggage compartment of such aircraft.

Each elevating unit 34 comprises an elevating member 38, a ground engaging assembly 40, and a laterally extendable carriage 42. The elevating member 38 of each unit 34 comprises a hydraulic jack, made up of a piston 44 and a mating cylinder 46. The upper or outer end of the piston 44 terminates in a ball-shaped bearing member 48 that is adapted to fit in a matching recess in a structural support member 50 which takes the loads from the bearing member 48 and transmits these into the main aircraft structure. A releasable locking member 51 is provided to hold the bearing member 48 in engagement with the support member 50. The piston 48 also has at its upper end a pivot attachment at 52 to a pivot mounting bracket 54 attached to the carriage 42.

The ground engaging assembly 40 of each unit 34 has the overall configuration of a collapsible tripod assembly, and it comprises an upper collar 56 fixedly attached to the upper end of the cylinder 46. There are a plurality of support legs 58 (three in the specific configurations shown herein), and these legs 58 are pivotally attached at their upper ends to the collar 56. Each of the legs 58 is provided with an extension strut assembly 60, made up of two sections 62 and 64 of a scissors strut and a third actuating strut 66 pivotally attached to the connecting pivot point of the two strut sections 62 and 64. The other end of each actuating strut is attached to a lower collar 68 that is slide-mounted for up and down movement at the lower end of the cylinder 46. The other end of the strut section 62 is pivotally connected at 70 at a fixed location on the cylinder 46, and the other end of the other strut 64 is attached at a pivot location 72 to its related leg 58.

When the collar 68 is slid upwardly over the cylinder 46, it causes the actuating strut 66 to extend the two strut sections 62 and 64 toward an "in line" position to extend the related leg 68. On the other hand, when the collar 68 is lowered, each of the actuating struts 66 act on their related strut sections 62 and 64 to collapse these sections 62 and 64 and bring the legs 58 inwardly towards the cylinder 46.

To raise the collar 68 so as to extend the legs 58, there is provided a ground engaging actuating rod 74, mounted for up and down movement in a lower tubular extension 76 of the cylinder 46. The function of the tubular extension 76 is to provide a slide mounting for the collar 56. The upper end of the rod 74 is attached to a head member 78 which in turn has a pair of diametrically opposed fingers 80 that attach the head member 78 to the collar 68. Positioned in the tubular extension 76 between the head member 78 and the lower wall 82 of the cylinder 46 is a compression spring 84 that urges the rod 74 downwardly toward its extended position. The tubular extension 76 is provided with a pair of vertical slots 86 to permit the up and down movement of the fingers 80.

Figure 5:
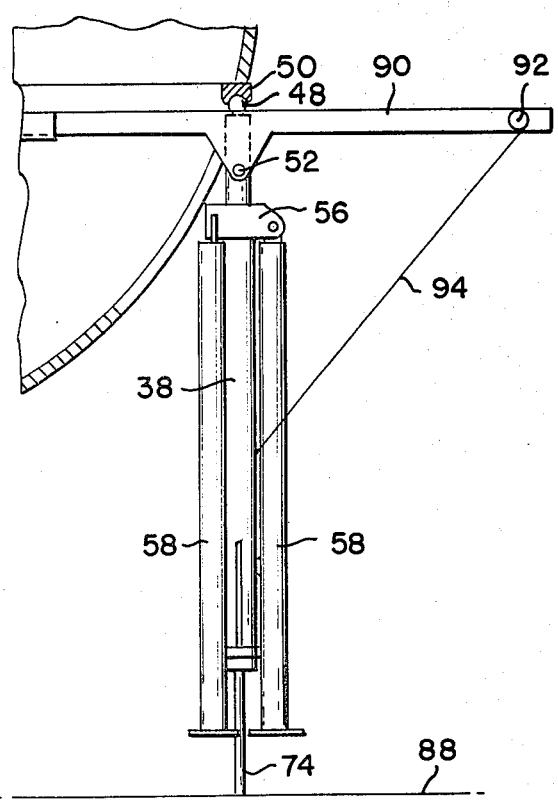
FIG. 5 is a view similar to FIGS. 3 and 4, showing the elevating unit being lowered to the ground surface.
Figure 6:
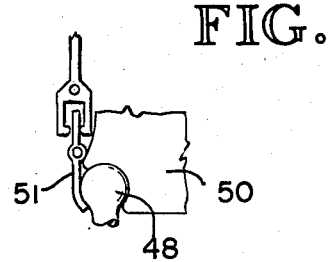
FIG. 6 is a view taken from approximately the same location as FIG. 5, showing details of the upper end of the elevating unit engaging aircraft structure.
Figure 7:
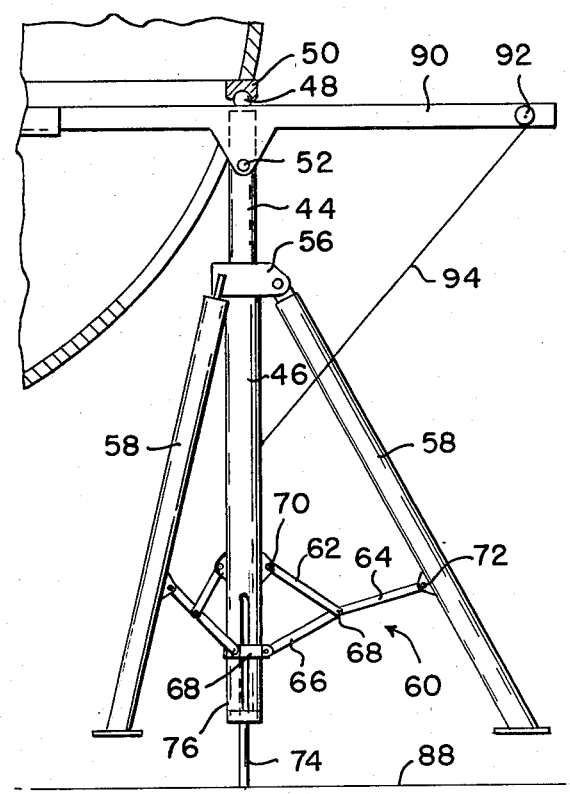
FIG. 7 is a view similar to FIG. 5, showing the elevating unit being extended downwardly, so as to partially expand its ground engaging tripod assembly.
Figure 8:
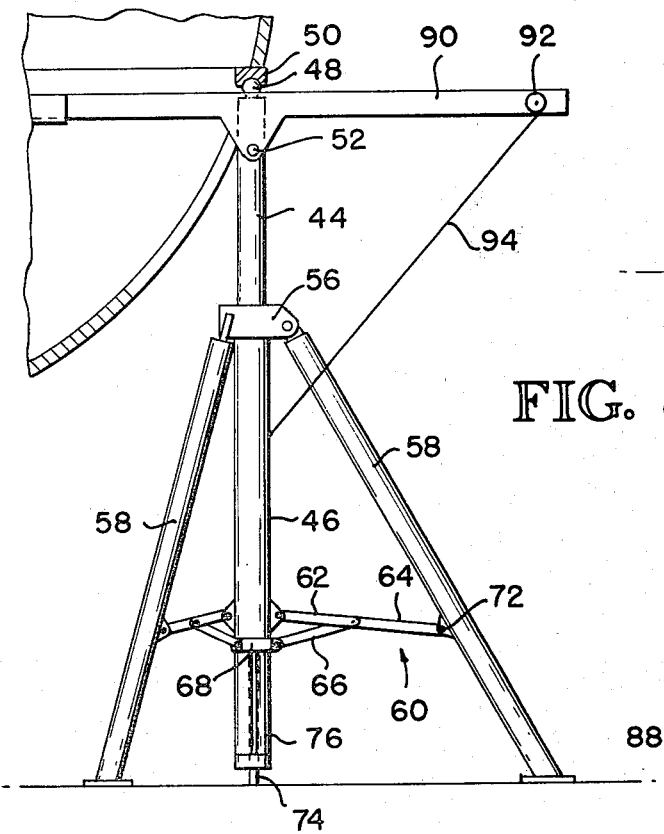
FIG. 8 is a view similar to FIG. 7, showing the elevating unit further extended so that the tripod assembly engages the ground surface, to permit the aircraft fuselage to be moved upwardly from the ground surface.
Figure 8A:
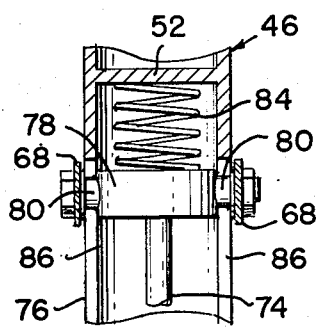
FIG. 8A is a sectional view, drawn to an enlarged scale, of a lower extension of the cylinder of the extension unit of the present invention.
Figure 12:
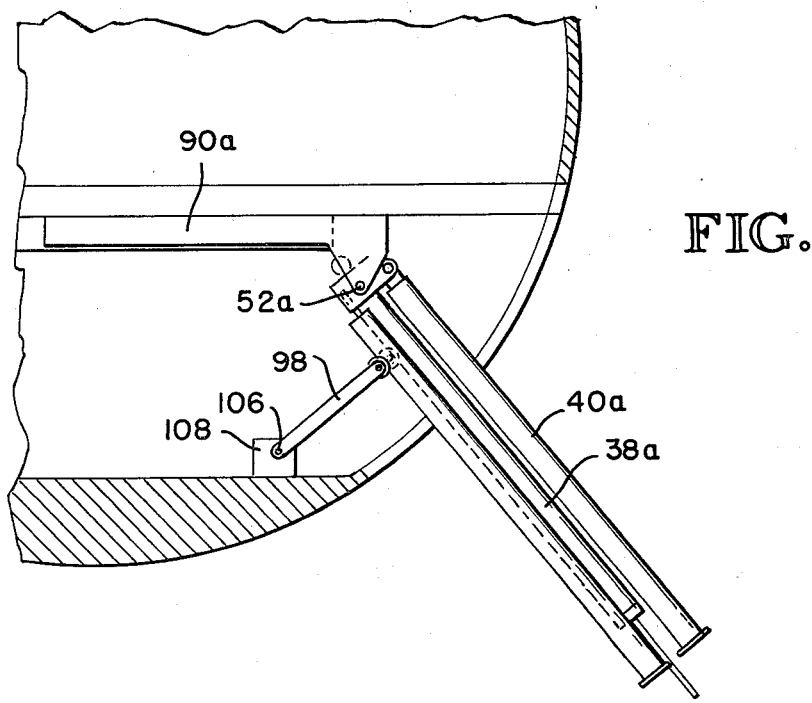
FIGS. 12 and 13 are views similar to FIG. 10, showing in sequence the elevating unit of the second embodiment being moved to its operating position.
Figure 13:
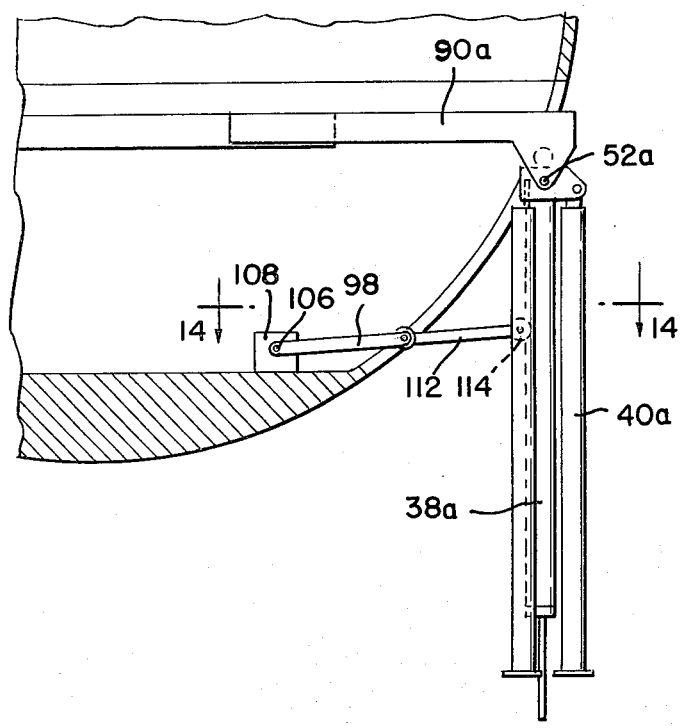
Figure 14:
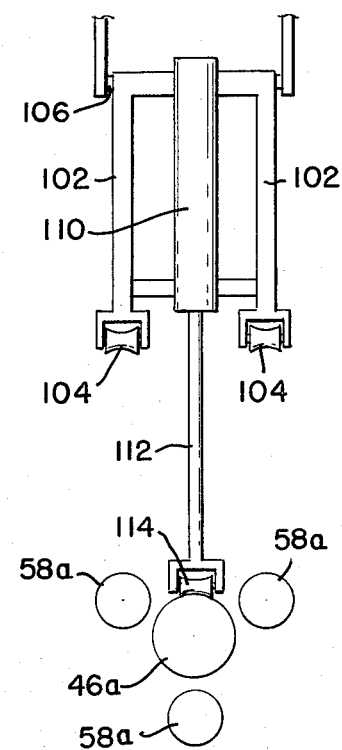
FIG. 14 is a view taken along line 14—14 of FIG. 13 showing the support member extended.
Figure 15:
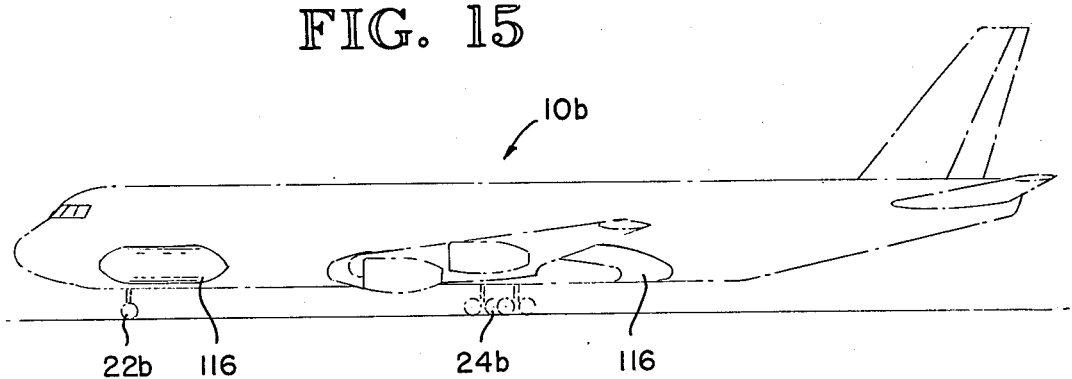
FIG. 15 is a side elevational view of an aircraft incorporating a third embodiment of the present invention.

With the legs 58 is their collapsed position, as shown in FIG. 5, the rod 74 is fully extended and reaches a moderate distance beyond the lower end of the tubular extension 76. When the cylinder 46 is lowered toward the ground surface 88, as in FIG. 7, the lower end of the actuating rod 74 engages the ground surface 88 to move upwardly into the extension 76 and move the lower collar 68 upwardly, relative to the cylinder 46, to cause the three extension strut assemblies to expand outwardly. As the rod 74 moves further into the extension 76, it moves the legs 58 to their fully extended position. In like manner, when the cylinder 46 is raised away from the ground surface 88, the compression spring 84 acts against the head member 76 to push the rod 74 outwardly and retract the strut assemblies 60 to move the legs 58 back toward the retracted position.

Figure 4:
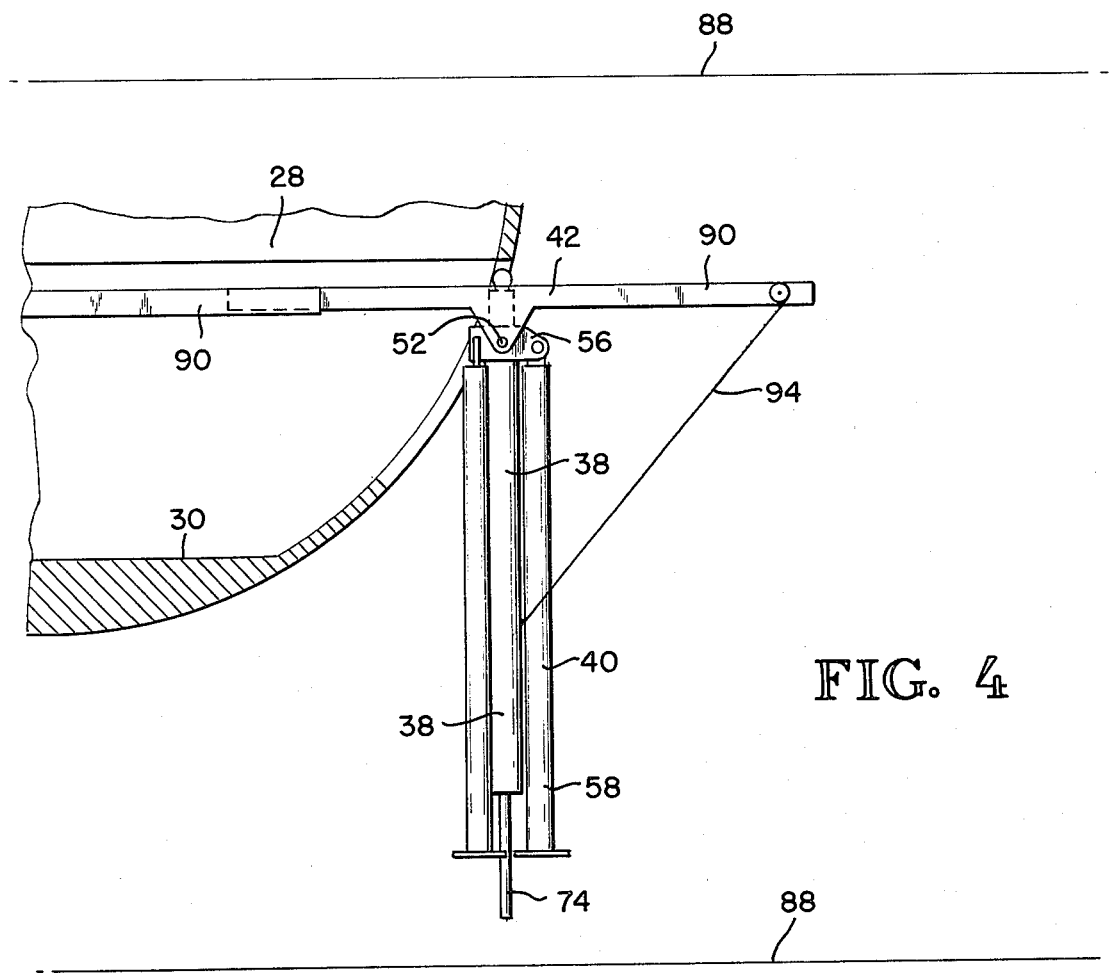
FIG. 4 is a view similar to FIG. 3, showing the elevating unit of FIG. 3 having been moved downwardly into its operating position.

The carriage 42 is or may be of conventional design, and as shown herein comprises a plurality of elongate extension members slide-mounted within one another. As shown herein, the aforementioned mounting bracket 54 is fixedly connected to the midlength of the outermost extension member 90. At the outermost end of the outer extension member 90, there is a roller 92 that engages a cable 94, an outer end of which is connected to the cylinder 46 at approximately its midlength. By extending the cable 94, the piston and cylinder assembly 44-46 can be lowered to its vertical operating position of FIG. 4. In like manner, by retracting the cable 94, the piston and cylinder assembly 44-46 can be raised to the position of FIG. 3. The opposite end of the cable 94 is connected to a suitable mechanism, such as a reel, to extend or retract the cable 94. It is readily apparent that other mechanical devices could be used to swing the piston and cylinder assembly 44-46 between the positions of FIG. 3 and FIG. 4.

To describe the overall arrangement of the present invention, in the particular configuration shown herein, there are four elevating units, each mounted in a related modular housing structure 36. The two rear units 34c and 34d are arranged so that one can be moved outwardly to one side of the aircraft and the other to the opposite side of the aircraft 10. The forward units 34e and 34f are similarly arranged. Normally, the four units 34c-f are fully retracted and are contained wholly within the fuselage outer skin or surface 26. There is for each unit 34 a related door 96 that would normally enclose its related unit 34 within the fuselage 12. The locations of the four elevating units 34c-f in their deployed positions are shown in broken lines in FIG. 2A, positioned adjacent the fuselage 12.

Let it now be assumed that the aircraft 10 has its landing gear 20 extended and is resting on the ground surface, as in FIG. 1. Let it further be assumed that it is such fairing structures 116 are mounted on opposite sides of the fuselage 12b adjacent the nose gear 22b, and the other two fairing structures 116 are located adjacent the main gear 24b on opposite sides of the fuselage 12b.

The elevating member 38b and the ground engaging assembly 40b are substantially similar to the corresponding components 38 and 40 of the first embodiment. However, the carriage assembly 42 of the first embodiment is eliminated, and to perform the function of that carriage structure, there is provided an actuating linkage 118.

Figure 17:
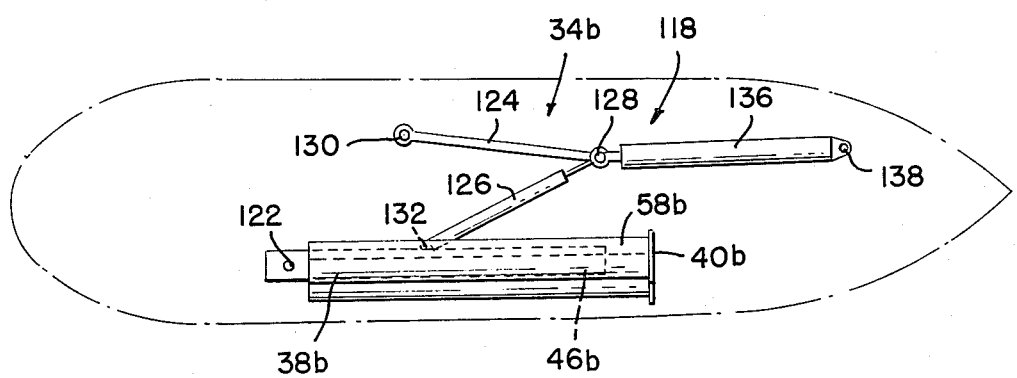
FIG. 17 is a side elevational view of the elevating unit of FIG. 16 in its retracted position.

FIG. 17 shows one of the elevating units 34b in its stowed position, where the legs 58b of the ground engaging assembly 40b are collapsed against the sides of the cylinder 46b of the elevating member 38b. In the stowed position, the piston and cylinder assembly 44b-46b are retracted, so as to be horizontally aligned and parallel with the longitudinal axis of the fuselage 12b. The upper or outer end of the piston 44 is pivotally attached to 122 stationary load bearing structure, indicated at 123, that transmits the load from the related unit 34b into the structure of the fuselage 12b. To move the related elevating unit 34b from the retracted position of FIG. 17 to the operating position of FIG. 18, the elevating member 38b and ground engaging assembly 40b are swung downwardly and forwardly to the position of FIG. 18, this being accomplished by the aforementioned actuating linkage 118.

This actuating linkage 118 comprises a scissors linkage having a first upper strut 124 and a second lower strut 126 pivotally connected one to another at 128. The upper strut 124 has its other end pivotally connected to stationary structure at 130, while the lower strut 126 has its outer or other end pivotally connected at 132 to its related cylinder 46b. The lower strut 130 is extendable, and is provided with a locking mechanism indicated schematically at 134. This locking mechanism 134 can be actuated to lock the strut 126 in its retracted position (shown in both FIGS. 17 and 18) or be released to permit the strut 126 to extend, as in FIG. 19.

Pivotally connected to the connecting point 128 of the two struts 124 and 126 is an actuating jack 136. The opposite end of this actuating jack is pivotally connected at 138 to the stationary structure of the aircraft fuselage 12.

Figure 16:
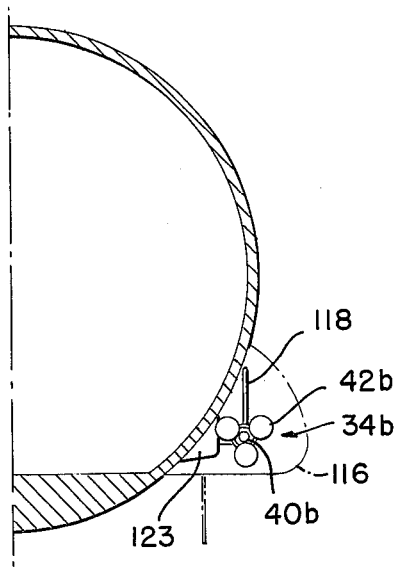
FIG. 16 is a sectional view taken along line 16—16 of FIG. 15, and showing one elevating unit of the third embodiment.
Figure 18:
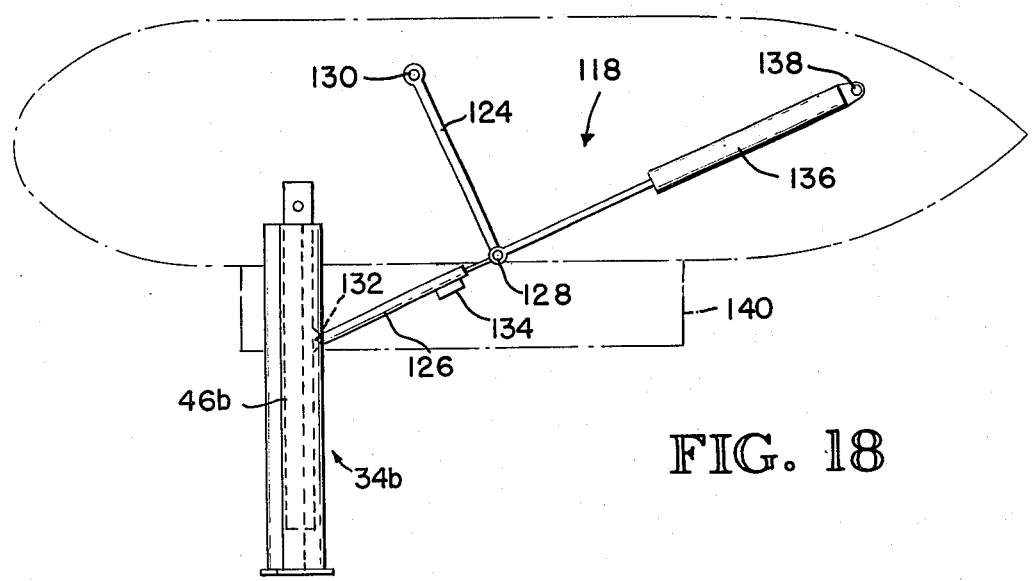
FIG. 18 is a view similar to FIG. 17, showing the elevating unit having been swung downwardly to its operating position.
Figure 19:
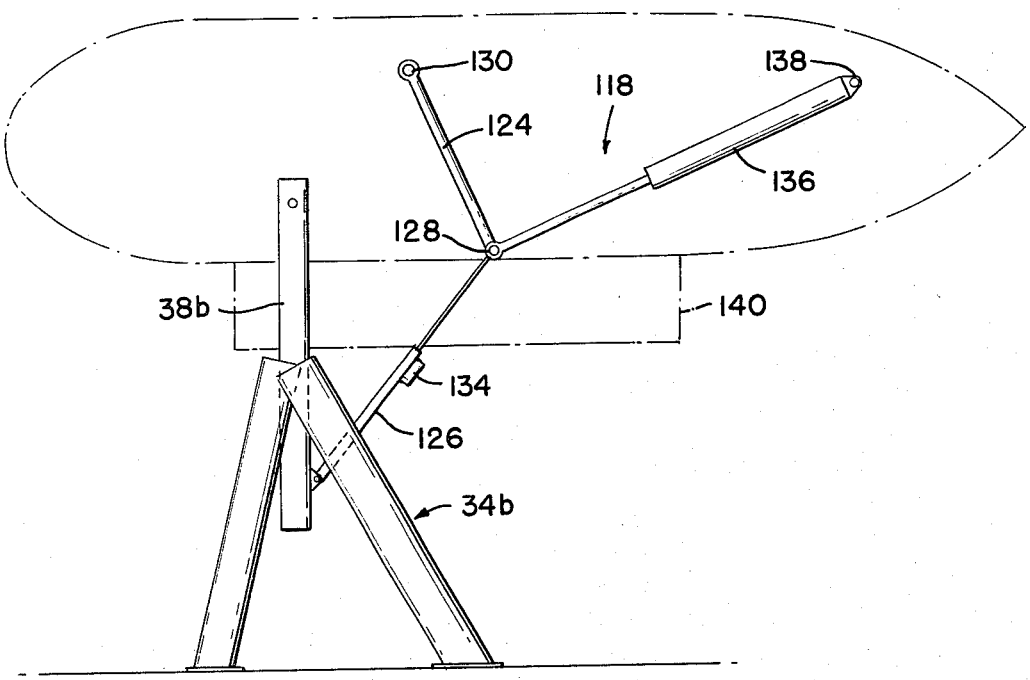
FIG. 19 is a view similar to FIGS. 17 and 18 showing the elevating unit extended toward its ground engaging position.

To describe the operation of this third embodiment, in FIGS. 16 and 17, one of the elevating units 34b is shown in its stowed position, where it is horizontally and longitudinally aligned within its fairing structure 116. To deploy each of the units 34b, a door 140 in the bottom of the fairing structure 122 is opened, and the actuating jack 136 is extended to in turn extend the scissors linkage made up of the two struts 124 and 126. The actuating jack 136 continues to extend until the elevating member 38b and the ground engaging assembly 40b are vertically oriented, as indicated in FIG. 18. At this point, the locking mechanism 134 of each of the struts 126 is released to permit extension of the struts 126 of the several elevating units 34b. Therafter, the operation of this third embodiment is substantially the same as that of the first embodiment, so the description will be only summarized herein.

The four piston and cylinder assemblies 44b-46b are extended to free the landing gear 22b and 24b from the ground, so that these can be retracted. Thereafter, the piston and cylinder assemblies 44b-46b are retracted so that the fuselage 12b of the aircraft 10b can be lowered closer to the ground location. After the loading or unloading operation for the aircraft 10b, the four piston and cylinder assemblies 44b-46b are raised to permit the landing gear 22b and 24b to be extended to their operating positions. Then the four piston and cylinder assemblies 44b-46b are retracted, raised by the linkages 118 to their horizontal position within their respective pods 116, and the doors 140 are closed. The aircraft 10b is now ready for normal operation.

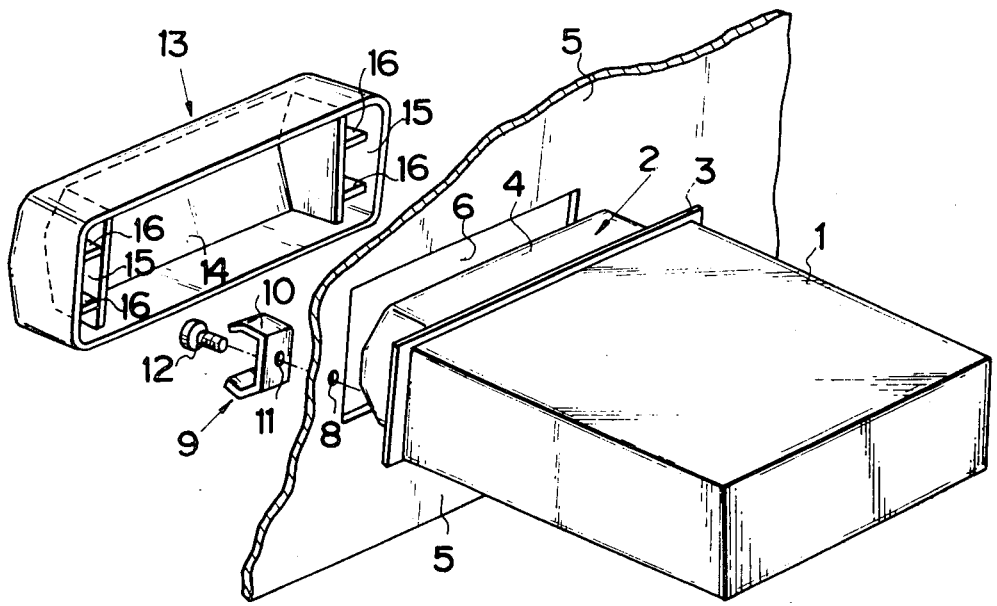

I claim:

1. In combination with an aircraft having landing gear which has a retracted position for flight operation and an extended position for take-off and landing, said aircraft being characterized in that with the aircraft being supported from a ground surface by the landing gear in the extended position, said aircraft is supported at a first operating level, an apparatus adapted to enable said aircraft to be at a relatively low position relative to the ground surface for loading and unloading cargo therefrom, said apparatus comprising a plurality of elevating units, each elevating unit being located in said aircraft at a related support position where there is a related aircraft bearing member fixedly mounted to a structural frame of said aircraft, each of said elevating units comprising:
  (a) a laterally extendable carriage having a first stowed position in said aircraft and a second operating position located outwardly of said aircraft,
  (b) a hydraulic elevating member comprising a cylinder and piston which are mounted to said carriage and have a generally horizontal stowed position with said carriage in its stowed position, and a second operating position wherein said elevating member extends downwardly from said extendable carriage at the support position, said piston having a rod extending upwardly from said cylinder with the elevating member in its operating position, said piston rod having at its upper end a matching bearing member to engage the bearing member at the support location, so as to transmit vertical and lateral force components directly into the bearing member of the structural frame independently of the carriage,
  (c) a ground support assembly mounted to said cylinder, said support assembly comprising a plurality of leg members pivotally mounted at upper ends thereof at circumferentially spaced locations at an upper end portion of the cylinder, said leg members having a first collapsed position alongside of said cylinder and an expanded support position where said leg members extend downwardly and outwardly from the upper end portion of the cylinder, each leg having at its lower end a ground engaging foot portion,
  (d) a leg deploying means comprising a strut assembly having a first collapsed position where said leg members are in their collapsed position and a second deployed position where said leg members are held outwardly in their expanded support position, said deploying means having an actuating member having a ground engaging portion positioned vertically below the foot portions of the leg members with the elevating member in its downwardly extending operating position, said actuating member being operatively connected to said deploying means in a manner that upward movement of the ground engaging portion of the actuating member relative to the cylinder causes movement of the deploying means to its deployed position, (e) said elevating unit being characterized in that with said elevating member and said carriage in the stowed position, the support assembly and the deploying means are in the collapsed condition, said elevating member and said carriage being movable to the operating position where the elevating member extends downwardly, with the ground engaging portion of the deploying means extending toward a ground surface below said aircraft, said elevating member being extendable by action of the cylinder and piston, so that said cylinder moves downwardly relative to the piston, causing said ground engaging member to engage said ground surface, thus extending the leg members from the collapsed position to the extended position, said elevating member then being retractable to a lower position where the matching bearing member of the piston is proximate the upper end portion of the piston and thus proximate the upper cylinder portion, whereby with the aircraft supported by the landing gear in the extended position, the elevating members of the elevating units can be moved outwardly to the operating position, the elevating members can be extended to cause engagement of the ground engaging portions of the actuating means to cause the leg members to move to the deployed position and then come into ground engagement, with further extension of the elevating units causing the landing gear to be raised from the ground, after which the landing gear can be moved to the retracted position, with subsequent retraction of the elevating members lowering the aircraft to a lower position, with the bearing portions of the piston rods being proximate the upper end portions of the cylinders, so that lateral load components on the aircraft are transmitted from the matching bearing members into the extended legs of the elevating units.

2. The apparatus as recited in claim 1, wherein said strut assembly comprises a plurality of scissor struts for related leg sections, each scissor strut having two pivotally joined sections, said actuating means comprising a plurality of actuating struts joined to respective scissor struts, said actuating member being operatively connected to said actuating struts in a manner that upward movement of said ground engaging portion causes said actuating struts to cause pivoting motion of the scissor struts to extend the scissor struts.

3. The apparatus as recited in claim 2, wherein there is spring means to urge each actuating member downwardly from its related cylinder to urge the strut assembly toward its collapsed position, whereby when said actuating member is moved out of ground engagement, said leg members move toward their collapsed position.

4. The apparatus as recited in claim 1, wherein each piston is connected at a pivot location to its related carrige member in a manner that downward movement of said piston and cylinder about said pivot location to its operating position brings the matching bearing portion of the piston rod into engagement with the bearing member of the aircraft, said apparatus further comprising locking means to maintain engagment of the matching bearing member with the bearing member of the aircraft.

* * * * *

United States Patent [19]

Ikeda et al.

[11] 4,378,099
[45] Mar. 29, 1983

[54] OUTER ESCUTCHEON FIXING STRUCTURE FOR CAR STEREO ETC

[75] Inventors: Tatsuo Ikeda; Shoji Ariga, both of Toda, Japan

[73] Assignee: Clarion Co., Ltd., Tokyo, Japan

[21] Appl. No.: 225,096

[22] Filed: Jan. 14, 1981

[30] Foreign Application Priority Data

Jan. 16, 1980 [JP] Japan ........................ 55-2512[U]

[51] Int. Cl.³ .............................................. G12B 9/00
[52] U.S. Cl. .................................................... 248/27.3
[58] Field of Search ............... 248/27.1, 27.3, DIG. 6

[56] References Cited

U.S. PATENT DOCUMENTS

| | | | |
|---|---|---|---|
| 2,618,998 | 11/1952 | Poupitch | 248/27.3 |
| 2,903,570 | 9/1959 | Worden | 248/27.3 |
| 3,799,483 | 3/1974 | Chiappinelli | 248/27.3 |
| 3,814,928 | 6/1974 | Grosseau | 248/27.3 |
| 4,313,584 | 2/1982 | Fukunaga | 248/27.3 |

FOREIGN PATENT DOCUMENTS 55-140625  4/1980  Japan .................................. 248/27.1

Primary Examiner—Francis K. Zugel
Assistant Examiner—Michael F. Trettel
Attorney, Agent, or Firm—Wallenstein, Wagner, Hattis, Strampel & Aubel

[57] ABSTRACT

An outer escutcheon fixing structure for car stereo etc. which is characterized by channel-shaped fixing members fitted to the front face of an escutcheon body for a car stereo etc. through an instrument panel of a car and horizontal members on an outer escutcheon member defining spaces for receiving tip ends of the respective channel-shaped fixing members. Either the channel-shaped fixing members or the horizontal members are imparted with resiliency in the vertical direction, so that the channel-shaped fixing members are resiliently engaged with the horizontal members to fix the outer escutcheon member.

3 Claims, 3 Drawing Figures